United States Patent
Gupta

(10) Patent No.: US 9,729,336 B2
(45) Date of Patent: Aug. 8, 2017

(54) SYSTEM AND METHOD FOR DELAYED PHONE CONFERENCING

(75) Inventor: Shekhar Gupta, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 832 days.

(21) Appl. No.: 12/359,852

(22) Filed: Jan. 26, 2009

(65) Prior Publication Data

US 2010/0189238 A1    Jul. 29, 2010

(51) Int. Cl.
*H04M 3/00* (2006.01)
*H04M 3/56* (2006.01)
*H04L 12/18* (2006.01)

(52) U.S. Cl.
CPC .......... *H04L 12/1818* (2013.01); *H04M 3/56* (2013.01); *H04M 2201/14* (2013.01)

(58) Field of Classification Search
CPC .... H04M 3/56; H04M 3/563; H04M 2250/62; H04M 3/568; H04M 3/567; H04W 4/08; H04W 4/16; H04W 4/06; H04W 4/14; H04W 4/12
USPC ............................. 379/202.01; 455/416, 466
See application file for complete search history.

(56) References Cited

U.S. PATENT DOCUMENTS

| | | | |
|---|---|---|---|
| 6,101,480 A | 8/2000 | Conmy et al. | |
| 8,358,762 B1* | 1/2013 | Renner et al. | 379/202.01 |
| 8,527,287 B1* | 9/2013 | Bhatia | 705/1.1 |
| 2003/0004773 A1* | 1/2003 | Clark et al. | 705/8 |
| 2005/0233759 A1* | 10/2005 | Anvekar et al. | 455/466 |
| 2007/0280459 A1* | 12/2007 | Yee | H04M 1/2471 379/201.01 |
| 2008/0226041 A1* | 9/2008 | Ramamoorthy et al. | 379/88.01 |
| 2009/0093240 A1* | 4/2009 | Lang | 455/416 |
| 2009/0204464 A1* | 8/2009 | Mujkic et al. | 705/9 |
| 2010/0220635 A1* | 9/2010 | Gisby | H04L 12/1822 370/261 |
| 2011/0058013 A1* | 3/2011 | Khot et al. | 348/14.09 |

* cited by examiner

*Primary Examiner* — Rasha Al Aubaidi
(74) *Attorney, Agent, or Firm* — Swanson & Bratschun, L.L.C.

(57) ABSTRACT

A system and method for phone conferencing through an interactive message. Information for a phone conference is received. The interactive message is sent to one or more users specified in the information inviting the one or more users to participate in the phone conference. A response is received including contact information and a time for a user to join the phone conference.

10 Claims, 5 Drawing Sheets

SYSTEM AND METHOD FOR DELAYED PHONE CONFERENCING

BACKGROUND OF THE INVENTION

Usage of telecommunication services and products have grown nearly exponentially in recent years. The growth is fostered by advancements in devices, systems, protocols, features, and accessibility. In particular, more and more people work remotely or telecommute to perform the requirements of their job. In many cases, businesses, organizations, and individuals utilize phone conferences to perform meetings for purposes of convenience or to electronically connect remote parties.

In many cases; accepting or rejecting a phone conference may be difficult for users that travel extensively, are away from their computer, or that have scheduling conflicts. Similarly, specifying availability for a phone conference may be limited based on the time limitations of current technology. As a result, phone conferencing remains a useful tool that is not fully utilized because of various limitations.

BRIEF SUMMARY OF THE INVENTION

One embodiment provides a system and method for phone conferencing through an interactive message. Information for a phone conference may be received. The interactive message may be sent to one or more users specified in the information inviting the one or more users to participate in the phone conference. A response may be received including contact information and a time for a user to join the phone conference.

Another embodiment provides a conferencing server for implementing a phone conference utilizing one or more SMS messages. The conferencing server may include a message control operable to receive information scheduling a phone conference. The message control may be operable to send an SMS message to multiple users for the phone conference. The message control may receive multiple from the plurality of users specifying contact information and a time for each of the plurality of users to join the phone conference. The conferencing server may further include a conferencing bridge in communication with the message control. The conferencing bridge may be operable to implement a phone conference between the plurality of users utilizing the information, the contact information, and the time.

Yet another embodiment provides a conferencing server which may include a processor for executing a set of instructions and a memory for storing the set of instructions. The set of instructions may be executed by the processor to receive information for a phone conference, send an interactive message to one or more users specified in the information inviting the one or more users to participate in the phone conference, receive a response including contact information and a time for the phone conference from a user, call the user utilizing the contact information and the time to connect the user to the phone conference.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

The illustrative embodiments provide a system and method for phone conferencing. In one embodiment, an organizer or sending party may communicate an interactive message to one or more users. The interactive message is an electronic message configured to be received by one or more telephonic devices. In one embodiment, the interactive messages may be Short Message Service (SMS) messages, instant messages (IM), text messages, or other forms of abbreviated messages that may be used by wireless telephonic devices such as cell phones, BlackBerrys®, and other similar smart devices.

The receiving parties or one or more users that receive the interactive messages may accept or decline the invitation to participate in the phone conference. Similarly, the user may select a delayed start time to join the phone conference, as well as specify contact information. The contact information is a phone number, IP address, wireless identifier, or other communications connection or device utilized to connect to the phone conference. In one embodiment, the phone conference participants, including the sending party and receiving parties, may be interconnected through a conference bridge. However, any number of conferencing systems, devices, and modules suitable for connecting one or more remote parties may be utilized. Users may connect to the conference bridge utilizing the interactive message as a key, password, or identifier. In another embodiment, a response to the interactive message may be utilized by the conferencing bridge or server to dial one or more participants.

Figure 1:
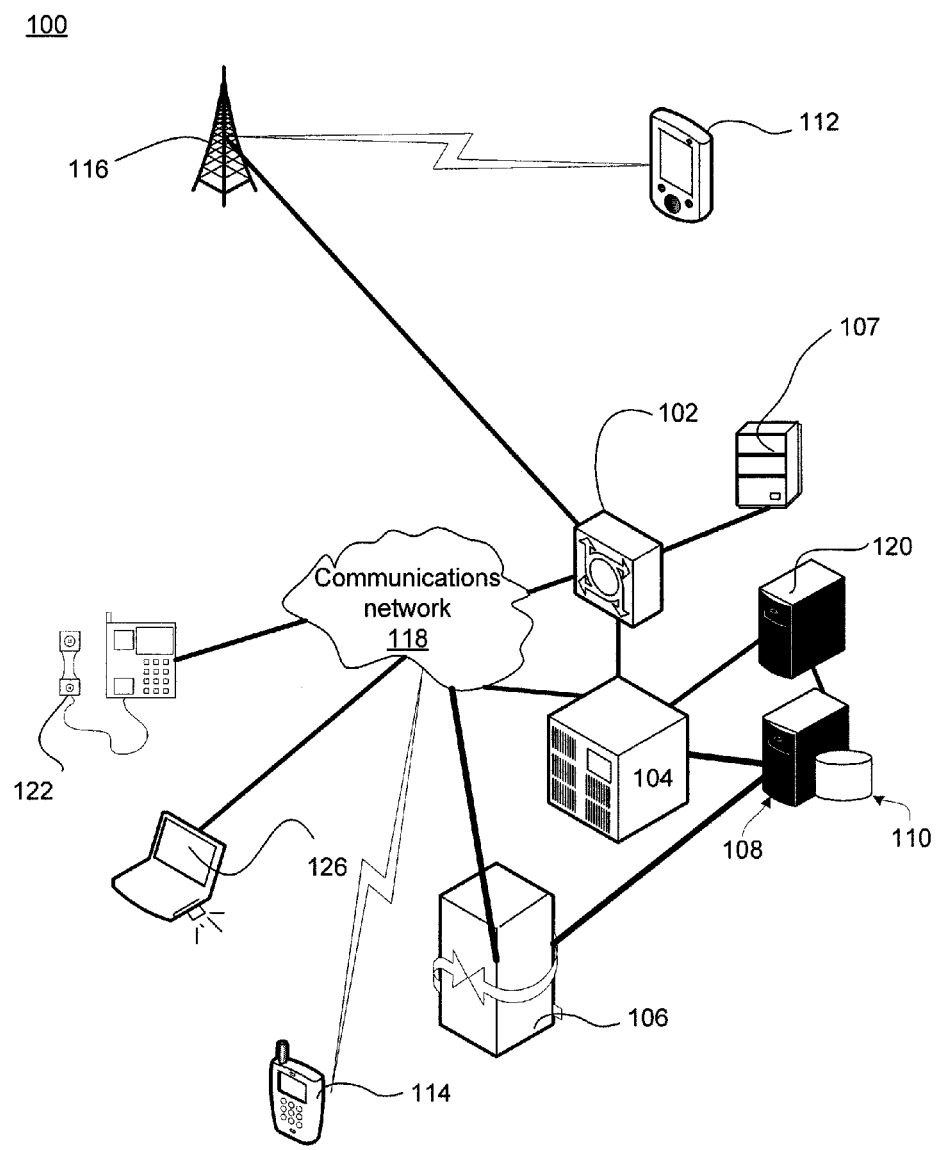
FIG. 1 is a pictorial representation of a communications system in accordance with an illustrative embodiment.

FIG. 1 is a pictorial representation of a communications system in accordance with an illustrative embodiment. The communication system 100 of FIG. 1 includes various elements used for wireless and wired communication. In one embodiment, the communications system 100 may include a mobile switching center (MSC) 102, a local exchange 104, a SMS gateway 106, a voicemail system 107, a SMS router 108, a SMS database 110, wireless devices 112 and 114, a transmission tower 116, a communications network 118, a conferencing server 120, a home telephone 122, and a client 126. The different elements and components of the communications system 100 may communicate using wireless communications, such as satellite connections, WiFi, WiMAX, CDMA wireless networks, and/or hardwired connections, such as fiber optics, T1, cable, DSL, high speed trunks, and telephone lines.

The wireless devices 112 and 114 may communicate with the transmission tower 116 or other devices of the communications network 118 using communications protocols, such as time division multiple access (TDMA), code division multiple access (CDMA), global systems for mobile (GSM) communications, personal communications systems (PCS), WLAN, WiMAX, or other frequently used cellular and wireless data communications protocols and standards. The wireless devices 112 and 114 may include cellular phones, Blackberry® devices, personal digital assistances (PDA), mp3 players, laptops, evolution data optimized (EDO) cards, multi-mode devices, and other wireless communication devices and elements.

Communications within the communications system 100 may occur on any number of networks which may include wireless networks, data or packet networks, cable networks, satellite networks, private networks, publicly switched telephone networks (PSTN), the communications network 118, or other types of communication networks. The communications network 118 is an infrastructure for sending and receiving messages and signals according to one or more designated formats, standards, and protocols. The networks of the communications system 100 may represent a single communication service provider or multiple communications services providers. The features, services, and processes of the illustrative embodiments may be implemented by one or more elements of the communications system 100 independently or as a networked implementation.

In one embodiment, the MSC 102, voicemail system 107, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry® devices, car radios, high definition televisions, and other electronic devices.

The MSC 102 may be a switch used for wireless call and message control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include or communicate with a home location register (HLR), directory, and visitor location register (VLR) that may be used to implement different features of the illustrative embodiments. The voicemail system 107 may be an integrated part of the MSC 102 or alternatively may be an externally connected device.

In one embodiment, the conferencing server 120, SMS gateway 106, SMS router 108, and SMS database 110 may be integrated with the MSC 102 or local exchange 104. The conferencing server 120 is a computing and communications device configured to provide network services including interconnection of users or devices for phone conferences.

SMS service or text messaging is generally available to subscribers of a cellular or other wireless network, as well as, Internet Protocol (IP) applications. The illustrative embodiments may utilize SMS, text, instant, or other forms of messages herein referred to as interactive messages. The SMS router 108 is a device for communicating interactive messages generated by the conferencing server 120, wireless devices 112 and 114, and other devices of the communications system 100. The SMS database 110 is a structured collection of records, data, or interactive messages communicated by the SMS router 108. The SMS database 110 may store interactive messages, drafts, user preferences, connection information, and other details that may be included or utilized to send the interactive messages.

The SMS gateway 106 is a device or service transforming messages to mobile network traffic from other media, or vice versa, allowing transmission or receipt of interactive messages with or without the use of a mobile phone. As a result, invitations to join a phone conference hosted by the conferencing server may be communicated through the gateway 106. The interactive messages utilized to accept, reject, join at a later time, or specify more specific parameters may be converted to any number of formats by the SMS gateway 106. In one embodiment, the SMS gateway 106 may convert the message to a format that may be received by the applicable user or telephonic device. For example, the message may be sent as a text message to a cell phone, as an email to a VoIP phone, and as a chat message to the PDA of a user. User preferences entered by the scheduler or individual user may be utilized by the SMS gateway 106 to make the appropriate conversion or formatting.

The local exchange 104, the MSC 102, the SMS gateway 106, the conferencing server 120, the SMS router 108, and/or other elements of the communications system 100 may communicate using a signal control protocol, such as a signaling system number 7 (SS7) protocol or TCP/IP protocols. The SS7 protocol or similar protocols are used in publicly switched networks for establishing connections between switches, performing out-of-band signaling in support of the call-establishment, billing, routing, and implementing information-exchange functions of a publicly switched network or the communications network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 107. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, and additional digital and data services to subscribers, such as home phone 122. The local exchange 104 may also enable Voice over Internet Protocol (VoIP) communication of the home telephone 122 through a data network. VoIP works by sending voice information in digital form, such as packets, rather than using the traditional circuit-committed protocols of the publicly switched network. The local exchange 104 may be or include a feature server, a call control agent, or an IP gateway for implementing VoIP communications. The local exchange 104 and client 126 may be utilized to perform VoIP communications utilizing a soft phone executed by the client 126. A soft phone is a software program for making telephone calls over the Internet or a network connection using a general purpose computer rather than using dedicated voice communications hardware.

The communications system 100 may further include any number of hardware and software elements that may not be shown in the example of FIG. 1. For example, in order to facilitate VoIP communications, the communications system 100, the MSC 102, and local exchange 104 For example, may include additional application servers, media servers, service brokers, call agents, edge routers, gateways (signaling, trunking, access, sub, etc.), IP network service providers, adapters, exchanges, switches, users, and networks. The local exchange 104 or other components of a wire line network, such as a data, PSTN, VoIP, or other wired network may implement the features and perform the methods herein described.

The MSC 102, local exchange 104, conferencing server 120 and other elements of the communications system 100 may include an authentication space. The authentication space may be a partition, module, or other storage or memory of the server designated by the communications service provider. The authentication space may validate that a user or device, such as client 126, is allowed to authorize or access the MSC 102, local exchange 104, conferencing server 120, SMS server 108, or other components of the communications system to initiate or modify a phone conference, set preferences, implement changes, review information, or perform other updates. For example, a user may be first required to provide a secure identifier, such as a user name, password, or other authentication code or hardware interface, to verify the user is authorized to make changes within the authentication space.

The authentication information may also be used to create a secure connection between the client and the conferencing server 120. The secure connection may be a virtual private network tunnel, an encrypted connection, firewall, or other form of secured communications link. The communications network may use any number of gateways, proxies, applications, or interfaces for allowing the client 126 to communicate with the conferencing server and the SMS router 108 through the communications network 118. In one embodiment, the conferencing server 120 may use a host client application for communicating with numerous clients.

The home telephone 122 may be a standard device that provides dialing and voice conversation capabilities. Home telephone 122 may be integrated in any number of other devices or may be used in different forms. The communications services accessible from the home telephone 122 may include standard telephone service or VoIP telephone service. The home telephones 122 may be VoIP telephones or may be standard telephones that include a modem and/or VoIP adapters for enabling VoIP communications. A special dial tone, message, web alert, or other feedback may specify once or repeatedly that the home telephones 122 or wireless devices 112 or 114 is scheduled for a phone conference. For example, the home telephones 122 may sound a double chirp when an accepted phone conference is scheduled to be implemented. The user may cancel use of any features by reentering a feature command or a cancellation command.

The client 126 may be a personal computer for performing and executing programs and instructions and accessing the communications network 118. However, the client 126 may be any computing devices suitable for communicating with the communications network 118 through a network connection. The communications network 118 may be a fiber optic, cable, or telephone network or other wired network suitable for communication over a hard wired connection with the client 126. In one embodiment, the home may include a wireless router, adapter, switch, hub, or other suitable interface that allows the client 126 to communicate with the communications network 118. Alternatively, the client 126 may communicate with the communications network 118 through a wireless connection. The client 126 may utilize a website or locally stored conferencing application to communicate with the conferencing server 120. The conferencing server 120, SMS gateway 106, and SMS router 108 may use a graphical user interface (GUI), such as website or program accessible from the client 126, home telephone 122 or wireless devices 112 and 114 in order to enter and receive input preferences for initiating and implementing a phone conference.

Figure 2:
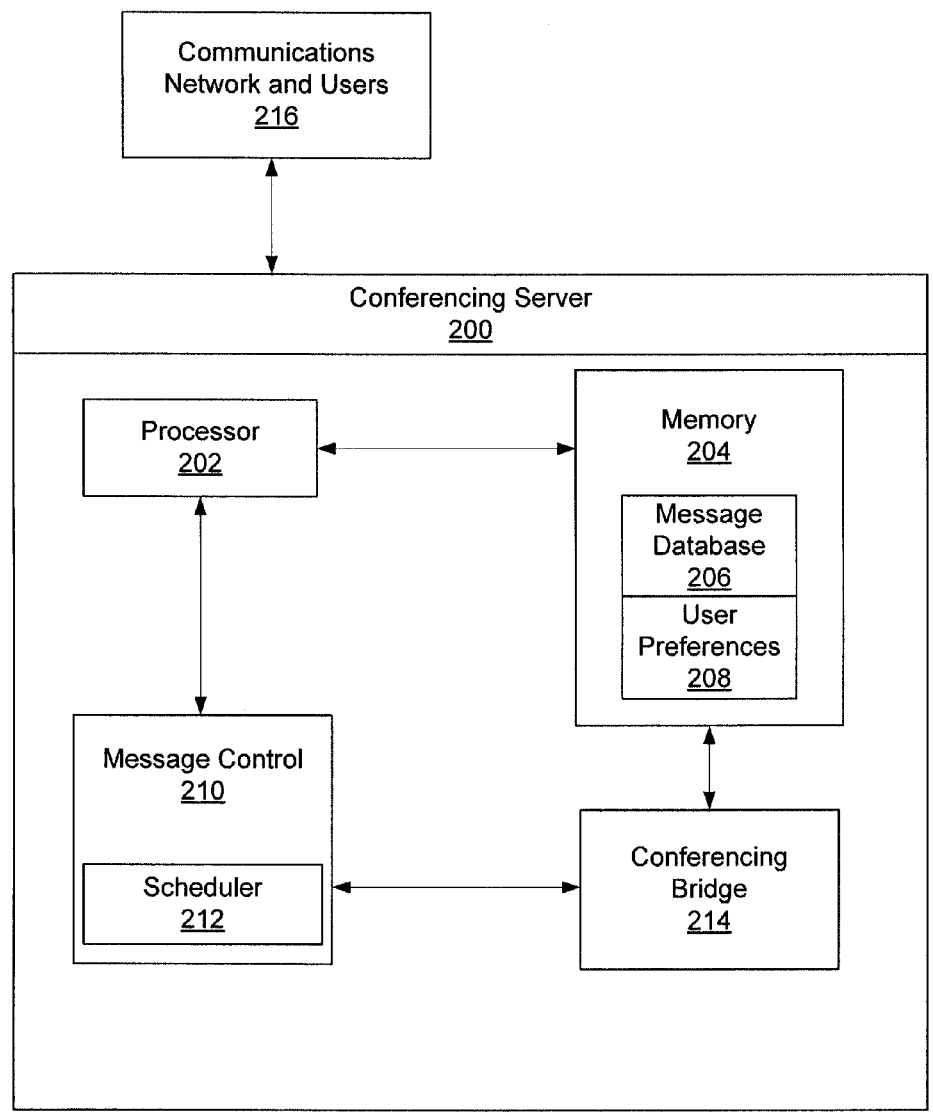
FIG. 2 is a block diagram of a conferencing server in accordance with an illustrative embodiment.

FIG. 2 is a block diagram of a conferencing server in accordance with an illustrative embodiment. The conferencing server 200 may include any number of hardware, software and firmware elements, all of which are not specifically described herein for purposes of simplicity. In particular, the conferencing server 200 may include any number of communications busses, cards, circuits, ports, boards, chips, and other elements. In one embodiment, the conferencing server 200 may include a processor 202, a memory 204, a message database 206, user preferences 208, a message control 210, a scheduler 212, and a conferencing bridge 214. The conferencing server 200 may communicate with a communications network and users 216. The conferencing server 200 is a particular implementation of the conferencing server 120 of FIG. 1. Although not specifically described, a phone, such as a cell phone, may include the elements, components, and modules described for the conferencing server 200.

The processor 202 is circuitry or logic enabled to control execution of a set of instructions. The processor 202 may be a microprocessor, digital signal processor, central processing unit, or other device suitable for controlling an electronic device including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

In one embodiment, the conferencing server 200 may include any number of modules that may be stored within the memory 204 for execution by the processor 202 in order to implement the message features and services herein described. The message control 210 is a control module managing the sending and receiving of interactive messages to and from the communications network and users 216. In one embodiment, the message control 210 may include the scheduler 212 to schedule and coordinate the transmission of interactive messages to one or more designated receiving parties.

The conferencing server 200 may be accessed by one or more users through a network. The users may directly access and connect to the conferencing server 200 through a website, FTP, encrypted tunnel, or other secure network connection. In another embodiment, the users may store and execute a local conferencing application that communicates and interfaces with the conferencing server 200 to implement the features herein described. In one embodiment, the conferencing application may be a standalone software program or an add-on to a program such as Microsoft Outlook© or other e-mail applications. The message control 210 may store information relating to the phone conference including a time, individual to be invited, a call-in number related to the conferencing bridge 214, critical participants, time zone, and other information, logic, or factors that may affect the implementation of the phone conference. The message database 206 stores records of all messages sent from the conferencing server 200, as well as, the associated communication and details and related information.

The user preferences 208 is the information and details of the organizer and receiving parties that specify preferences for transmitting, receiving, accepting, and managing the interactive messages. The user preferences 208 may store information such as a phone number or IP address to be utilized for a specified recipient, preferred reminder times, deletions, preferences, and other information that may be utilized by the message control 210 to manage the interactive messages invitation and other available features of the conferencing server 200. The user preferences 208 may also specify a type of message to be utilized. For example, a user may specify that an invitation to a phone conference is to be duplicated or replicated and sent in any number of formats to specified communications devices connections or identifiers. The user preferences 208 may be entered by the scheduler or by individual users. The conferencing bridge 214 is the circuitry, switches, devices, and system for interconnecting multiple users telephonically. The conferencing bridge 214 may utilize VoIP, POTS, or wireless communications to connect any number of users to the phone conference.

The message control 210 may utilize any number of messages as previously described. In one embodiment, the message control may utilize SMS messages to users that have a wireless device registered as their preferred method of contact. The interactive messages may include selection elements, indicators, drop-down lists, or other features described in more detail in FIG. 4. However, the interactive message may also be a simple text message for devices that are not configured or enabled to process messages with more detail. For example, a user may specify a response to an invitation by replying to the message with a keyword such as accept, reject, or other information. Instructions for responding to the message for such users may be included as part of the original invitation or interactive message.

The message control 210 may also be configured to receive information and implement commands utilizing voice commands or input. For example, the contact information and time may be received through a network connection or voice commands may be processed by the phone. The message control 210 may also send secondary messages to the participants in the phone conference based on the individual responses received from each of the users. In one embodiment, a new or corrected message may be to required to connect to the phone conference. For example, the scheduler 212 may send a secondary message to a user based on the delayed time specified by the user.

Figure 3:
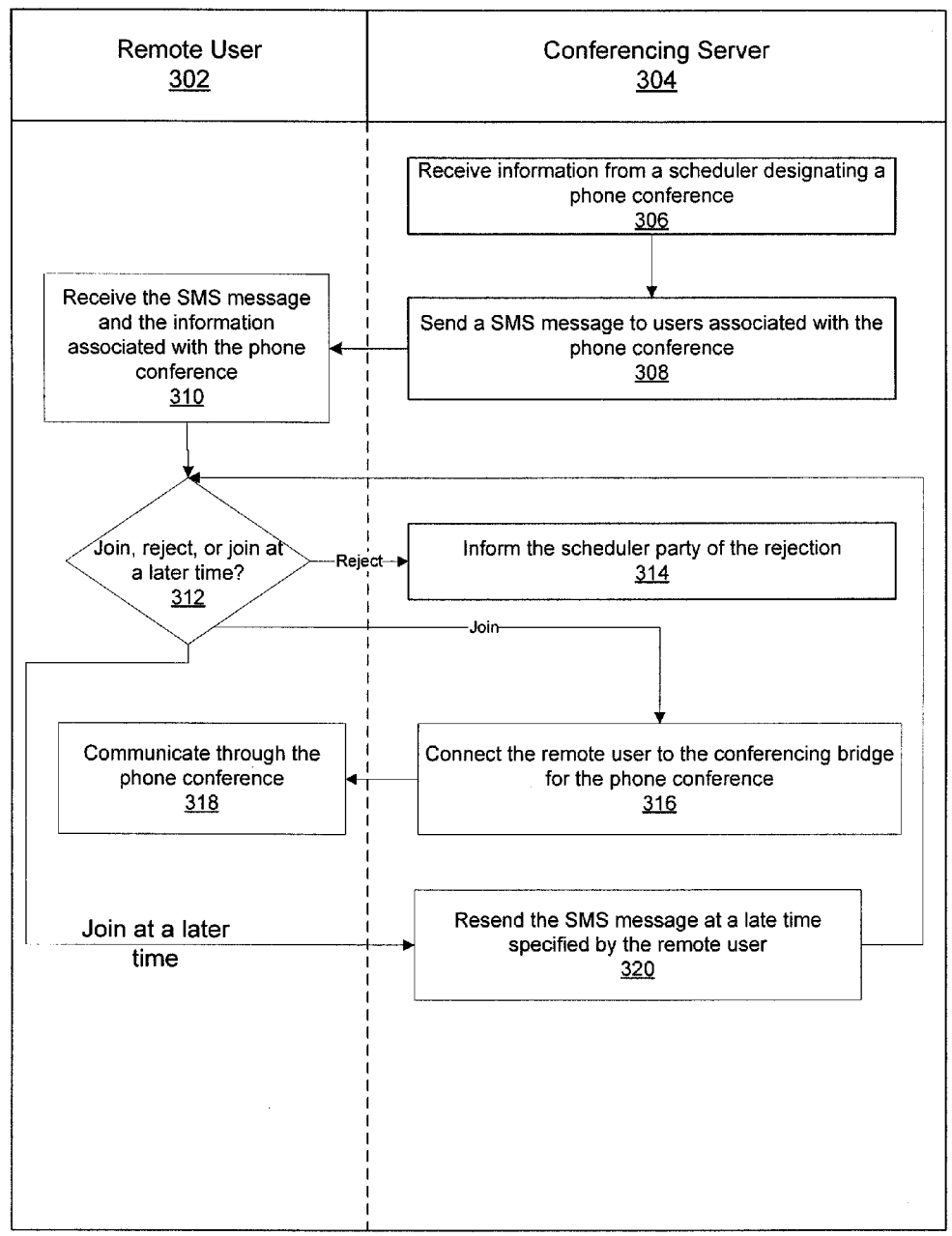
FIG. 3 is a flow chart of a process for implementing a phone conference utilizing one or more interactive messages in accordance with an illustrative embodiment.

FIG. 3 is a flow chart of a process for implementing a phone conference utilizing one or more interactive messages in accordance with an illustrative embodiment. The process of FIG. 3 may be implemented by a remote user 302 and a conferencing server 304. The remote user 302 represents a telephonic device operated by a user from a remote location. The conferencing server 304 may be one or more devices, systems, modules, or other elements for implementing a phone conference.

The process may begin by receiving information from a scheduler designating a phone conference (step 306). The information may specify the recipients or other users participating in the phone conference, a time to send the invitation, potential responses, critical parties, time zones, an originating location, dial-in number, or other information related to the phone conference. In one embodiment, the information specified in step 306 may be stored so that an initial invitation may be sent to the participants at a designated time based on user preferences.

Next, the conferencing server 304 may send an SMS message to users associated with the phone conference (step 308). User preferences of the scheduler or of individual users may specify a phone number, IP address, account number, user name, or other communications identifier to which the invitation is communicated. This information may also be utilized to dial the user automatically to initiate the call. Next, the remote user 302 receives the SMS message and information associated with the phone conference (step 310).

The remote user 302 determines whether to join, reject, or join at a later time (step 312). The determination of step 312 may be made based on user input. For example, the user may utilize a touch screen to select an interactive feature. In another embodiment, the user may automatically or manually reply to a message with a particular response. If the remote user 302 determines to reject the invitation, the conferencing server informs the scheduler of the rejection (step 314). During step 312, a response may be sent from the remote user 302 to the conferencing server 304 indicating the selection or manual input received from the user. Subsequent follow-up invitations or other interactions between the remote user 302 and the conferencing server 304 may occur after step 314.

If the remote user 302 determines to join the phone conference based on the invitation in step 312, the conferencing server 304 connects the remote user to the conferencing bridge for the phone conference step 316. Similarly, the remote user 302 communicates through the phone conference (step 318). If the remote user 302 determines to join at a later time, the conferencing server 304 resends the SMS message at a later time specified by the remote user (step 320).

In one embodiment, the SMS message may provide a reminder to the user to dial-in to the conferencing bridge. In another embodiment, the original or resent SMS message may be required to join the phone conference. For example, the SMS message may provide a token or identifier that grants permission or access to the conferencing bridge or conferencing server when dialing from the applicable telephonic device. The SMS message may include a link, selection element or other interactive feature that may be selected by the user to connect to the conferencing bridge and corresponding phone conference. Any number of dialing and authentication modules may be utilized by the telephonic device to implement the call to the conferencing server 304 and provide authorization information.

Figure 4:
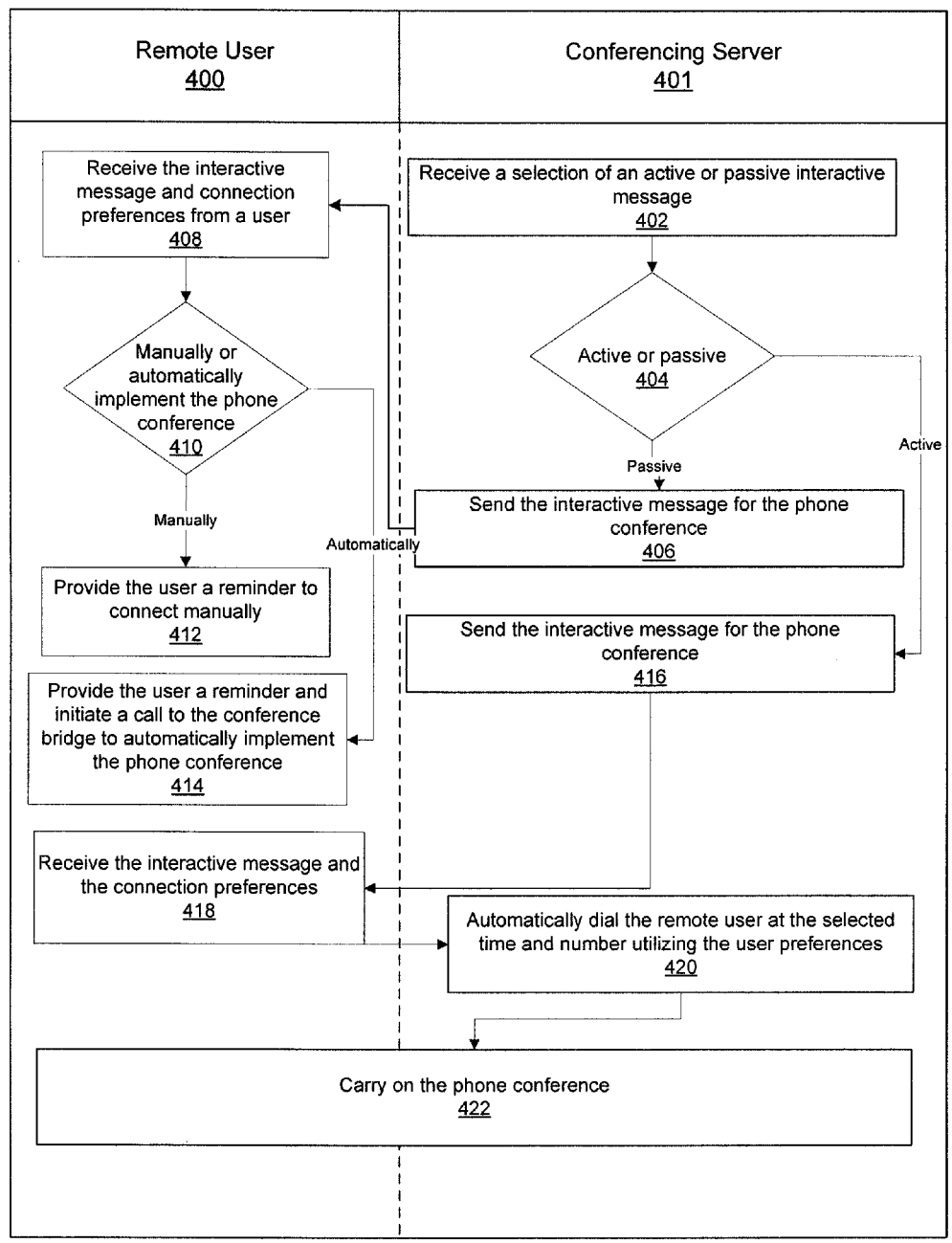
FIG. 4 is a pictorial representation of a process for implementing a phone conferencing utilizing interactive messages in accordance with an illustrative embodiment.

FIG. 4 is a pictorial representation of a process for implementing a phone conferencing utilizing interactive messages in accordance with an illustrative embodiment. The process of FIG. 4 provides additional details that may be implemented with the process of FIG. 3. As before, the process of FIG. 4 may be implemented by a remote user 400 and a conferencing server 401.

The process may begin by receiving a selection of an active or passive interactive message (step 402). The selection of an active or passive interactive message may be made by the scheduler of a phone conference. In one embodiment, the selection may be made based on the user preferences of the scheduler. In another embodiment, the selection of an active or passive interactive message may be based on the user preferences of individual participants in the phone conference. For example, a number of active interactive messages and passive interactive messages may be sent out for a single phone conference.

Next, the conferencing server 401 determines whether the interactive message is active or passive (step 404). The determination of step 404 may be implemented based on the selection or determination of step 402. In response to determining the interactive messages passive, the conferencing server 401 sends the interactive message for the phone conference to the remote user (step 406). Next, the remote user 400 receives the interactive message and connection preferences from a user (step 408). The remote user 400 determines whether to manually or automatically implement the phone conference (step 410).

In one embodiment, the determination of step 410 may be made based on the connection preferences of step 408. The connection preferences may be a single portion of the user preferences for the user. For example, the connection preferences within the user preferences may specify criteria, conditions, selections, and other information for a single phone conference or a series of phone conferences based on user input. The connection preferences may also be referred to as the contact information and the time.

In response to a determination to manually implement the phone conference, the remote user provides the user a reminder to connect manually (step 412). The reminder may be an audible, visible, or tactile alert or reminder given to a user. In one embodiment, the remote user 400 may receive a flashing screen, vibration, or chirp indicating that it is time for the phone conference.

In another embodiment, the remote user 400 may display the original interactive message utilized to invite the user to participate in the phone conference for connecting through the conferencing bridge. The reminder may specify a call-in number, password or pin number, participant, and any other information associated with the phone conference for the convenience of the remote user 400. If the remote user 400 determines to automatically implement the phone conference in step 410, the remote user 400 provides the user a reminder and initiates a call to the conferencing bridge to automatically implement the phone conference (step 414).

In one embodiment, the call may be initiated by the remote user 400 based on the response to the interactive message. For example, the user may be played an alert and the remote user 400 or the conferencing server 401 may initiate the phone conference as a call to or from the applicable telephonic device. In another embodiment, the remote user 400 may be automatically connected to the conferencing bridge at the selected time. For example, a speaker feature available through the remote user 400 may be activated and the call may be initiated so that the user may automatically begin communications through the phone conference as initiated.

In one embodiment, the interactive message may provide an identifier or other authentication mechanism or information that may be utilized by the remote user 400 and the conferencing server 401 to authenticate that the remote user 400 has been invited to participate or listen-in on the phone conference. As a result, the user may not be required to file the specified dialing number or provide a participant code, pin number, password, authentication number, or other identifier. In other embodiments, the user may still provide the dial-in number and authentication information.

In response to determining the interactive message is active in step 404, the conferencing server 401 sends the interactive message for the phone conference to the network user (step 416). Next, the remote user 400 receives the interactive message and connection preferences for the phone conference and sends the connection preferences to the conferencing server 401 (step 418). The interactive message may be received from the conferencing server 401 and the connection preferences may be received based on a user input or selection.

Next, the conferencing server 401 automatically dials the remote user 400 at the selective time and number utilizing the user preferences (step 420). The remote user 400 may be dialed during step 420 to automatically connect the remote user 400 to the phone conference in response to the user answering the call. By automatically dialing the remote user 400, the phone conference may be initiated without requiring further input from the user. In one example, an interactive voice response (IVR) system may inform the user that he or she is about to be connected to the phone conference in order to allow the user to prepare for the phone conference hang-up or otherwise reconfigure the timing of the phone conference based on the user's individual circumstances. Next, the remote user 400 and the conferencing server 401 carry on the phone conference (step 422). Step 422 may be performed in response to the user answering the call initiated or dialed by the conferencing server 401 in step 420.

Figure 5:
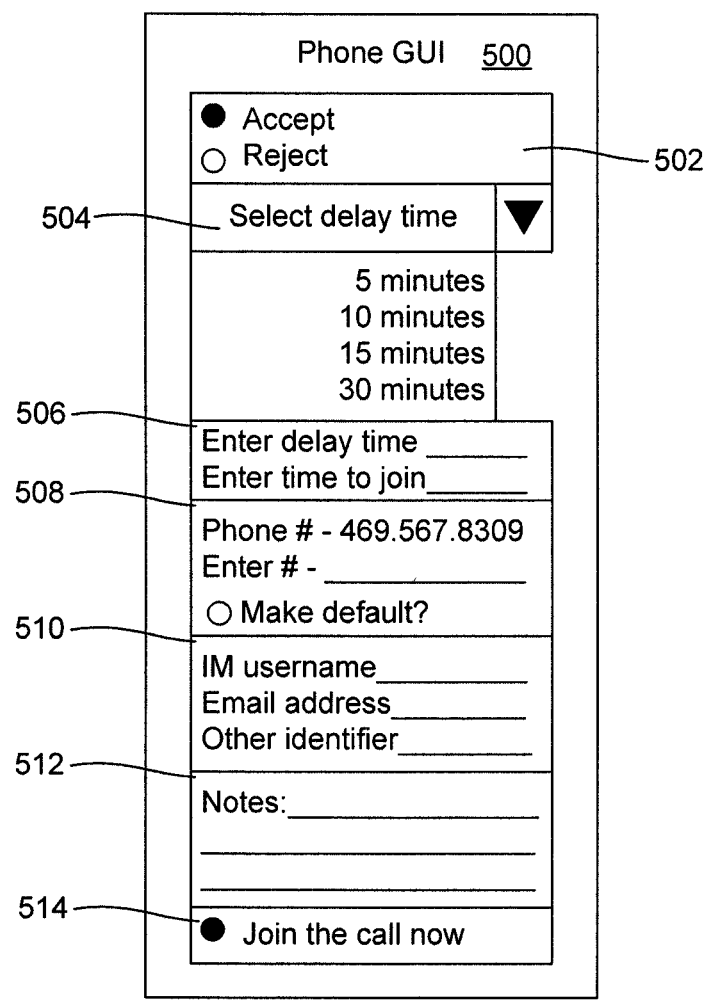
FIG. 5 is a pictorial representation of a graphical user interface for a phone in accordance with an illustrative embodiment.

FIG. 5 is a pictorial representation of a graphical user interface for a phone in accordance with an illustrative embodiment. The phone GUI 500 is an interactive interface for displaying information and receiving input from a user. The phone GUI 500 may include any number of selection elements, interactive components, drop-down menus, buttons, icons, selections, or other elements. In one embodiment, the phone GUI 400 may include sections 502, 504, 506, 508, 510, 512, and 514.

The section 502 may allow a user to accept or reject an invitation. For example, once accepted, the specified device, phone number, IP address, user name, account, or connection may be connected to the conferencing bridge at the specified time. The conferencing bridge may dial the user at the specified number at the designated time.

Section 512 may allow a user to specify notes, information, or a caveat when giving the response of section 502. The section 404 may allow a user to specify a delay time before joining the phone conference. For example, a drop-down menu may allow a user to specify that he or she would like to join five, ten, fifteen or thirty minutes late.

In another embodiment, section 506 may allow the user to manually specify the delay time or a particular time to join the phone conference. As a result, the user may not be required to join the phone conference based on limitations of the communicating devices or system. The user may specify a particular time or delay based on their own schedule.

Section 508 may allow a user to specify a phone number or other information utilized to establish the phone conference. The phone number may alternatively include an IP address or user name for a VoIP telephone. Section 510 may allow a user to specify user preferences, including a user name and other information for the phone conference in question or for future phone conferences.

Section 514 may allow a user to utilize the SMS or interactive message to join the phone conference. Any number of software interfaces or scripts may be utilized by the phone GUI 500 to initiate the phone conference based on selection of an element in section 514. The interactive message may include details for dialing a specific number and entering a password, authorization code, access number or other identifier. In another embodiment, the interactive message may prompt the user to enter the identifier as needed by the conferencing bridge or server. In another embodiment, the telephonic device of the user may plan an alert before calling the conferencing bridge.

In one embodiment, the wireless, VoIP, or POTS phone may receive voice commands or input from the user. For example, the selections made in each of the sections 502-514 may be received based on voice commands. For example, the user may say "Delay joining the phone conference for 30 minutes and call me at 307-999-9999." In another embodiment, the user may utilize the phone and/or interactive message to speak a command such as "Join now" or "Join the scheduled phone conference."

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for phone conferencing through multiple interactive messages, the method comprising:
   receiving information from a scheduler for a phone conference including a conference start time;
   before the conference start time, sending a first interactive message to at least first and second remote users specified in the information inviting the first and second remote users to participate in the phone conference, wherein the first interactive message is transmitted to an initial first user device and an initial second user device, and wherein the first interactive message provides the first and second user with a listing of a plurality of selectable delayed participation times, and a field for designating a secondary user device which is different from the initial user device;
   receiving a response from the first remote user including (1) contact information designated by the first remote user and (2) an indication that the first remote user will join the phone conference;
   automatically initiating the phone conference with the scheduler and the first remote user, at the initial first user device, at the conference start time;
   receiving a response from the second remote user including (1) contact information designated by the second remote user including contact information for a designated secondary user device and (2) a specific delayed participation time selected from the plurality of selectable delayed participation times for the second remote user's participation in the phone conference;
   sending a second interactive message to the secondary user device designated by the second remote user at the delayed participation time selected by the second remote user;
   receiving a response from the second remote user including an indication that the second remote user will join the phone conference;
   automatically connecting the secondary user device of the second remote user to the phone conference with the scheduler and the first user.

2. The method of claim 1, further comprising:
   receiving user preferences from the scheduler controlling the sending of the interactive message.

3. The method of claim 1, wherein the interactive message is a short messaging service (SMS) message, a text message or an instant message.

4. The method of claim 1, wherein the response from the first or second remote user is a voice command received through an interactive voice response system.

5. The method of claim 1, further comprising: authorizing the one of the first or second remote user to join the phone conference utilizing the interactive message.

6. The method of claim 5, wherein the interactive message provides a dial-in number and identifier to join the phone conference.

7. The method of claim 1, wherein the contact information received from the first or second remote user specifies a phone number at which to call the first or second remote user.

8. The method of claim 1, wherein the contact information and the delayed participation time are received utilizing voice commands from the second remote user.

9. A conferencing server comprising:
   a processor for executing a set of instructions; and
   a memory for storing the set of instructions, wherein the set of instructions are executed by the processor to:
   receive information from a scheduler for a phone conference including a conference start time;
   before the conference start time, send a first interactive message to first and second remote users specified in the information inviting the first and second remote users to participate in the phone conference, wherein the first interactive message is transmitted to an initial first user device and an initial second user device, and wherein the first interactive message provides the first and second user with a listing of a plurality of selectable delayed participation times, and a field for designating a secondary user device which is different from the initial user device;
   receive a response from the first remote user including (1) contact information designated by the first remote user and (2) an indication that the first remote user will join the phone conference;
   automatically initiate the phone conference with the scheduler and the first remote user, at the initial first user device, at the conference start time;
   receive a response from the second remote user including both (1) contact information for the second remote user including contact information for a designated secondary user device and (2) a specific delayed participation time selected from the plurality of selectable delayed participation times for the second remote user's participation in the phone conference;
   send a second interactive message to the secondary user device designated by the second remote user at the delayed participation time selected by the second remote user;
   receive a response from the second remote user including an indication that the second remote user will join the phone conference;
   automatically connecting the secondary user device of the second remote user to the phone conference with the scheduler and the first user.

10. The conferencing server of claim 9, wherein the set of instructions further:
    authenticates the first and second remote users to join the phone conference utilizing the interactive message.

* * * * *